Figure 1:
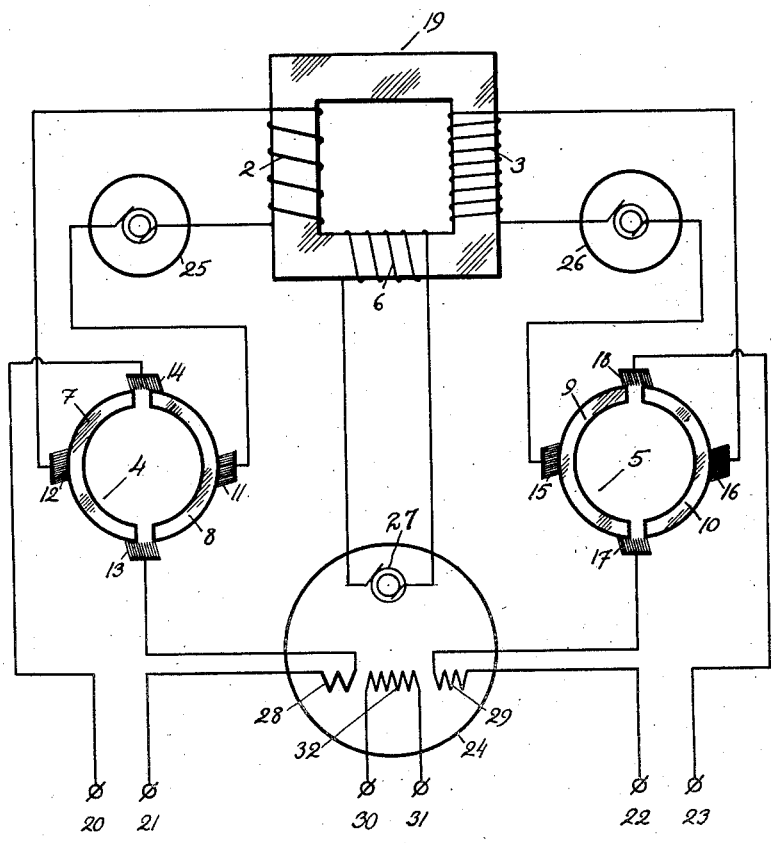

Jan. 2, 1934.  B. C. VON PLATEN  1,941,644
TRANSFORMER
Filed Sept. 19, 1931  4 Sheets-Sheet 1

INVENTOR
Baltzar Carl von Platen
BY
his ATTORNEY

Jan. 2, 1934.    B. C. VON PLATEN    1,941,644
TRANSFORMER
Filed Sept. 19, 1931    4 Sheets-Sheet 3

INVENTOR
Baltzar Carlson Platen
BY
Wm. J. Heslund
ATTORNEY

Jan. 2, 1934.  B. C. VON PLATEN  1,941,644
TRANSFORMER
Filed Sept. 19, 1931  4 Sheets-Sheet 4

Patented Jan. 2, 1934

1,941,644

UNITED STATES PATENT OFFICE 1,941,644

TRANSFORMER

Baltzar Carl von Platen, Stockholm, Sweden

Application September 19, 1931, Serial No. 563,740, and in Sweden September 22, 1930

13 Claims. (Cl. 171—119)

The present invention relates to converter plants for converting direct current of one voltage into direct current of another voltage or into alternating current or vice versa, which plants comprise a number of static or rotary transformers, commutating means, and a transformer magnetizing device.

A necessary condition for the correct operation of a commutator for converting direct current into alternating current or vice versa is that the alternating voltage be in phase with the alternating current. If this is not the case, i. e. if the alternating current is out of phase in relation to the alternating voltage, the voltage will apparently not be zero during that interval when the current is to be reversed. Under such circumstances sparking will occur and the only method of bringing the system into proper operation is to restore the phase coincidence between the alternating current and the alternating voltage. This problem is often met in systems of the above mentioned type in which transformer windings are associated with commutators and the present invention has for an object to establish such a phase coincidence by eliminating any reactive current components appearing in the commutator circuits. A further feature of the invention comprises a converter plant for carrying out the method above mentioned.

As is well known from the general theory of electrical machinery, the current delivered to or derived from an electric machine depends upon the relation between the counter-electromotive force induced in the armature of the machine and the terminal voltage thereof. If the machine is to operate as a generator, the induced voltage must be higher than the terminal voltage and so much higher that a load current corresponding to the output will flow in the right direction. From this simple reasoning it will be readily understood that the amplitude of the induced electromotive force in an electrical machine is an important factor in controlling the input or output current.

In case the transformer is of the rotating type as described, for instance in my U. S. Patents No. 1,916,240 and No. 1,905,660, the induced electromotive force is apparently proportional to the product of the flux caused by the rotor and the frequency of the variations therein. In such systems the electromotive force induced may therefore be easily controlled by varying the excitation of the rotor or the speed thereof which latter may be effected by regulating the speed of the prime mover driving the rotor shaft. It is also understood from the theory of synchronous machines that if the electromotive force does not exactly correspond to the load in a given moment there will be a phase displacement between voltage and current which in the present instance would be detrimental to the operation of the commutator.

If, on the other hand, the transformers used in the converter system are of the static type as will be more closely described in the following, the excitation energy necessary for producing the alternating flux in the transformer cores will have to be supplied from the primary side unless special measures are taken. As, however, the excitation current component is displaced nearly ninety electrical degrees from the voltage, it is necessary to neutralize this component. It is proposed to remove the excitation component from the primary circuit by supplying the excitation energy from a separate alternating current source independent of the current passing through the commutator circuit.

The rotor controlling the induced voltage in a rotary transformer and the separate alternating current source controlling the induced voltage in a static transformer may, for the sake of simplicity, be generally called the "transformer magnetizing device".

According to the method of the invention, impulses caused by reactive current components in the commutator circuits are utilized to control automatically the transformer magnetizing device so as to alter the induced electromotive force and thereby to neutralize said components and establish practically sparkless commutation.

According to one embodiment of the invention, a differential impulse, occurring upon the primary ampere turns of a transformer differing from its secondary ampere turns, is used for controlling the transformer magnetizing device, it being understood that the active ampere turns of the primary winding of a transformer should always be equal to the active ampere turns of its secondary winding, whereas any excitation component, when and if present, for instance in the primary circuit, would not follow this rule and therefore would immediately cause said differential impulse.

The invention will be more fully described by reference to the diagrams of connections according to the invention shown in the accompanying drawings in Figs. 1–4.

Figure 2:
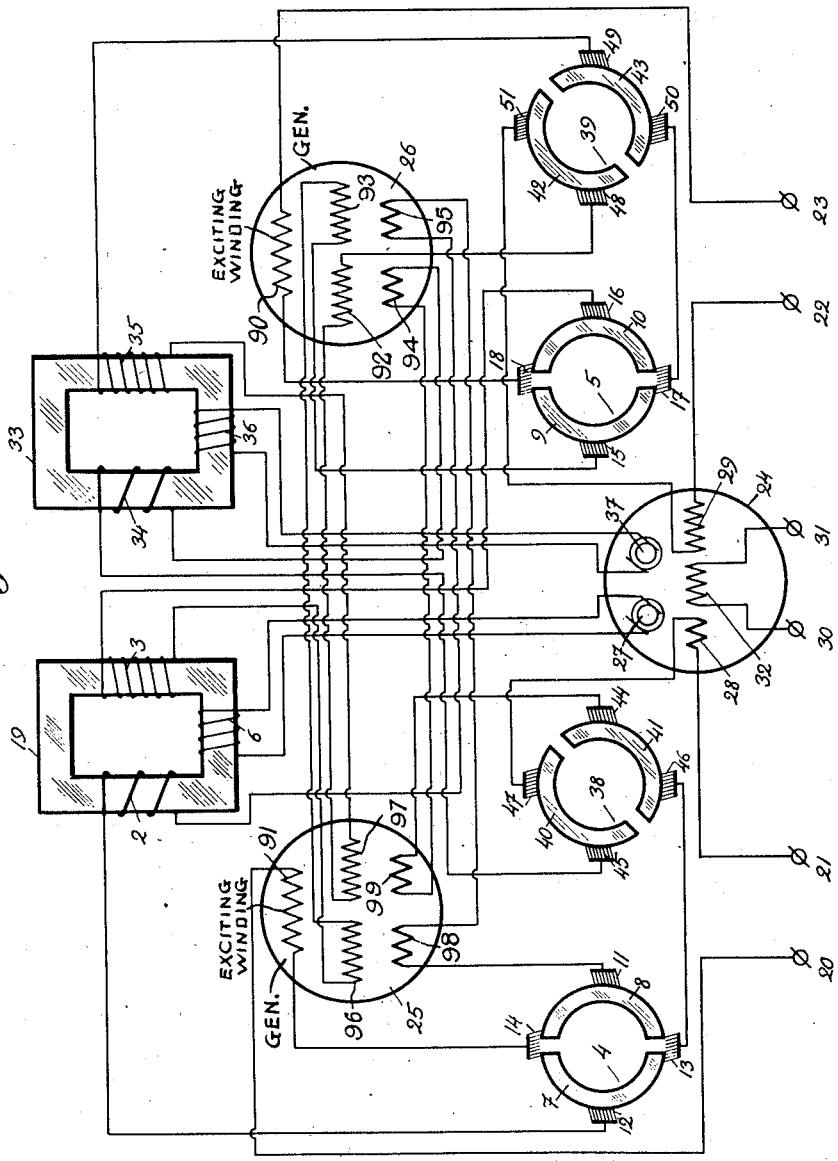
Figure 3:
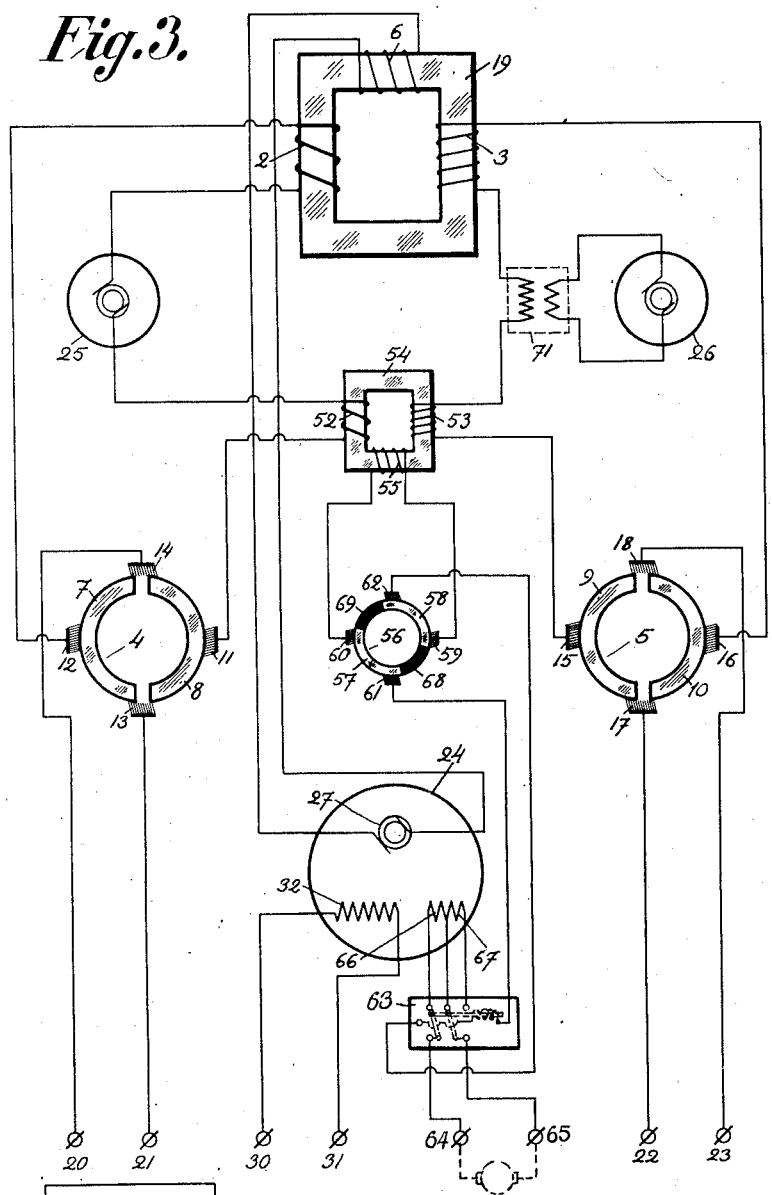
Figure 3A:
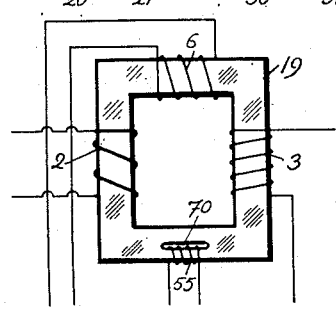
Figure 4:
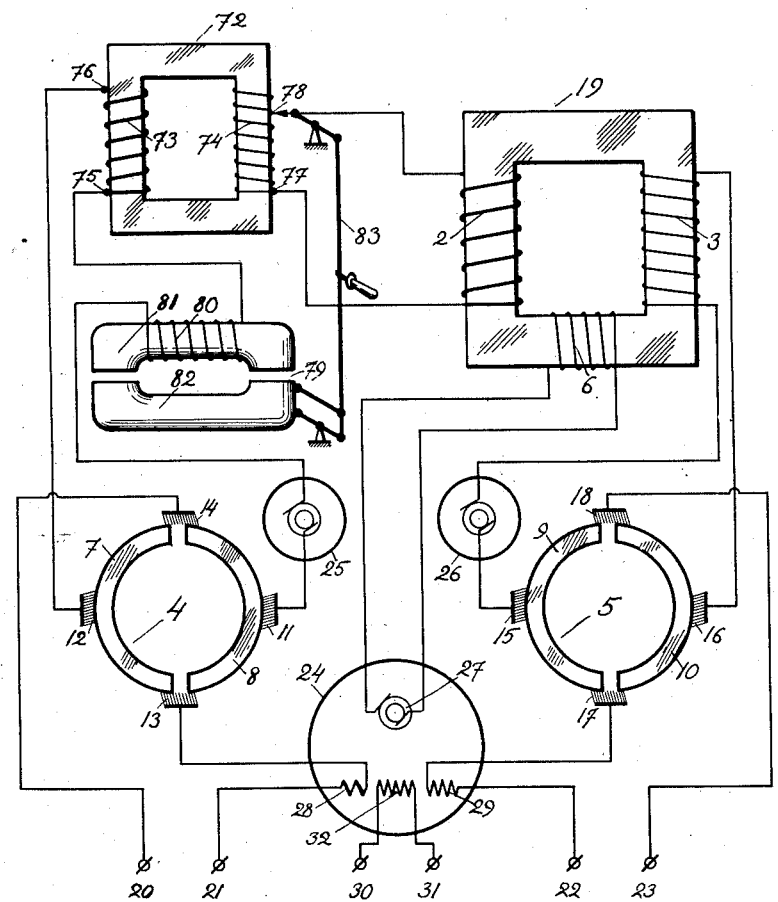

In Fig. 1 an embodiment of the invention is shown applied to a transformer of stationary type for transforming direct current into direct current of another voltage, and for obtaining a good general view only one-half of the system is shown. In Fig. 2 the same device is shown to which the other half of the system is added. In Figs. 3 and 3a an embodiment is shown which may be employed either if direct current is withdrawn from the secondary side or if the alternating current obtained is used directly. A further development of the device shown in Fig. 1 is embodied in Fig. 4 showing a simple arrangement for making possible alteration of the ratio of transformation. In all said diagrams only such parts are shown in detail which are necessary to an understanding of the invention and have not been previously disclosed, for example by my Patents Nos. 1,905,660 and 1,916,241 and my application Serial No. 557,626. Further, in all the embodiments shown in the drawings, the invention is described as applied to transformers of the stationary type only. The invention may, however, as will be clear from the above, in a fully analogous manner be applied also to transformers of the rotating type. The exciting generator shown in the drawings corresponds in such cases to any suitable source of energy influencing the magnetic flux through the operating windings of the machine, as for instance the driving motor of the rotary transformer or the like.

In Fig. 1 reference character 19 designates the iron core of a transformer of the stationary alternating current type provided with a primary winding 2 and a secondary winding 3 which are connected each to a rotating commutator 4 and 5, respectively. The commutators are each provided with two segments 7, 8 and 9, 10, respectively. Said segments cooperate with four contact brushes on each commutator which are designated 11, 12, 13, 14 and 15, 16, 17, 18, respectively. The brushes are arranged at equal peripheral distances. The primary winding 2 of the transformer is connected to the brushes 11 and 12 of the commutator 4, whereas the secondary winding 3 thereof is connected to the brushes 15 and 16 of the commutator 5. Direct current is supplied to the commutator 4 from a source of direct current 20, 21 connected to the brushes 13 and 14, and direct current can be withdrawn from the commutator 5 by the terminals 22, 23, connected to the brushes 17, 18. The transformer is further provided with a tertiary winding 6 serving as an exciting winding for the transformer and during operation supplied with an alternating voltage from a separate exciting generator 24. The rotor of said generator is during operation rotating synchronously with the rotated parts of the commutators 4 and 5. This may, for example, be obtained by mechanically connecting said parts to each other. Hence the reversal of the commutators will take place, that is, a pair of brushes will pass the gap between adjacent segments, at the instant when the varying magnetic flux induced by the exciting current in the winding 6 passes through its extreme values and therefore is practically constant. For enabling a non-sparking commutation the plant is in a manner more fully disclosed in the above mentioned Patent No. 1,916,241, provided with commutating generators 25 and 26, by which commutating voltages are set up in the windings being commutated. Though the commutating generator 26 is in the diagram directly connected into the alternating current circuit of the secondary side it may often, especially if the secondary voltage is very high, be advantageous to carry through said connection and perhaps also the connection of the other commutating generator by means of an auxiliary transformer as set forth in the said specification.

The exciting generator 24 may be of some suitable type known per se, as for instance a usual two-phase synchronous generator having a voltage diagram consisting of rectangles separated by zero intervals of same length as the rectangles.

It will be clear that, if, due to the variations of the exciting flux, such voltages are induced in the primary winding 2 that they compensate the current supplied thereto by the commutator 4, the number of ampere-turns of the primary winding will during all conditions of load remain equal or approximately equal to the ampere-turns of the secondary winding 3, whereby a constant unidirectional voltage is obtained at the terminals 22, 23. If for any reason said induced voltage in the primary winding 2 should not be of sufficient magnitude for the compensation of the primary voltage supplied thereto the ampere-turns of said winding would be greater than the ampere-turns of the secondary winding due to the reactive or excitation current component. This component may obtain such value as to damage the plant, for example due to energy that is supplied during the commutation interval by the exciting winding 6 to the induced winding 27 of the exciting generator 24.

In order to eliminate such disturbances the voltage generated by the exciting generator is according to the invention controlled by the primary and secondary currents, said generator being according thereto excited not only by an exciting winding 32 fed by a separate source of direct current 30, 31 but also by two additional exciting windings 28, 39 counteracting each other, the winding 28 thereof being connected to the primary and the winding 29 to the secondary direct-current side of the transformer. The relation between the numbers of ampere turns in these two windings is equal to the ratio of the transformer, that is, equal to the relation between the ampere turns of the windings 2 and 3. If the ampere-turns of the transformer are the same on the primary and secondary side, the influences of the windings 28 and 29 will neutralize each other. If, however, the number of ampere-turns of the primary winding has a tendency to exceed or fall below that of the secondary winding the windings 28 and 29 will, due to the change in the difference between the primary and secondary currents flowing through said windings, cause a change in the normal voltage of the exciting generator which change is proportional to the difference between the ampere-turns of the windings 28 and 29 and will increase or decrease the voltage induced in the primary winding 2, so that the inaccuracy will be compensated.

The part of the direct-current line on the high-voltage side of the transformer which is connected to the winding 29 may advantageously be grounded adjacent to said winding. A corresponding grounding may of course, if suitable, also be provided on the low-voltage side of the transformer.

In the embodiment of the invention above described the secondary pulsating direct-voltage is produced by means of a single phase transformer. To obtain a constant direct voltage it is necessary to provide transformers adapted to transform two-phase or multiphase currents, said transformers having either independent exciting generators for each phase or a common exciting generator of two-phase or multi-phase type respectively.

In Fig. 2 a plant is shown in which the transformer 19 is combined with a transformer 33 arranged in analogous manner to the transformer 19. The parts of the plant already described with reference to Fig. 1 are designated in Fig. 2 with the same reference characters. The transformer 33, the voltage of which is 90 electrical degrees displaced in phase with respect to the voltage of the transformer 19, is also provided with primary and secondary windings 34 and 35, respectively, and a tertiary winding 36 fed by an induced winding 37 on the exciting generator 24. The high and low voltage sides of the transformer 33 are connected to commutators 38 and 39 which consist of segments 40, 41 and 42, 43, respectively, and brushes 44, 45, 46, 47 and 48, 49, 50, 51, respectively, cooperating therewith. Also the primary and secondary alternating current sides of this transformer are connected to the commutating generators 25 and 26 in the manner shown in the drawings. Said generators 26 and 25 are provided with exciting windings 90 and 91 respectively and with induced windings 92 to 95 and 96 to 99 respectively. Winding 90 is connected in series with secondary line 23. Winding 91 is connected in series with primary line 20. Windings 95 and 98 are connected in series with primary 2. Windings 94 and 99 are connected in series with primary 34. Windings 93 and 96 are connected in series with secondary 3 and windings 92 and 97 are connected in series with secondary 35. The exciting windings accordingly induce voltages in the induced windings proportional to the current in the main primary and secondary lines, which voltages are adapted to control the commutation voltages in the primary and secondary windings above mentioned. The connections of the commutating generators are more fully described in the Patent No. 1,916,241 above referred to. As will be seen from the diagram, both halves of the plant will cooperate in such a manner that a constant direct voltage is obtained between the terminals 22 and 23.

In Fig. 3 an embodiment of the invention is shown which may be used either if direct current is withdrawn from the plant or if the alternating current is made use of directly, that is, if the commutator 5 in Fig. 1 is dispensed with. In this embodiment the primary and secondary alternating currents are utilized for causing the stabilization and are supplied to the primary and secondary windings 52 and 53, respectively, of an auxiliary transformer 54. The windings 52 and 53 are connected in series to the primary and secondary windings of the main transformer and have the same ratio as said windings. Hence the resultant field-strength of the windings of the auxiliary transformer will become zero when the primary and secondary ampere-turns of the main transformer (and also of the auxiliary transformer) are equal. As soon as a difference between the said ampere-turns occurs, the resultant field-strength in the auxiliary transformer is no longer zero but varies synchronously with the alternating current through the windings 52 and 53. In a third winding 55, which will be herein termed the auxiliary winding, provided on the auxiliary transformer, an alternating current will be induced, the magnitude and direction of which is a function of the current to be compensated.

The device is further provided with an auxiliary commutator 56 rotating synchronously with the commutators 4 and 5 and consisting of two segments 57, 58 co-operating with brushes 59, 60, 61 and 62 which are placed at equal distances around the periphery of the commutator in such a manner that the brushes 59, 60 and 61, 62, respectively, are placed diametrically opposite each other. The brushes 59 and 60 are directly connected to the winding 55 and the brushes 61 and 62 are connected to a relay device 63. This relay is of any known type selectively operated in accordance with the direction of current supplied from brushes 61, 62 to connect source 64, 65 of direct current to either of two opposed windings 66, 67. The relay may, for example, be of the kind described in my copending application Ser. No. 557,626 which discloses a relay operated by a pair of opposed transmission channels each having one or more space discharge amplifiers therein. The channels are selectively operated in accordance with the direction of current flow to unbalance the channels and to cause a resultant excitation of, for example, opposed windings 66 and 67. The opposed exciting windings 66, 67, of the exciting generator 24 are thus energized according to the direction of flow of a direct current supplied to the relay 63 from the brushes 61, 62. It will readily be understood that the alternating current created in the winding 55 is converted by the commutator 56 into direct current, the direction of which is determined by the excess ampere-turns of the primary or secondary windings of the transformer. As the impulse from the winding 55 through the relay 63 is required only during the commutating intervals of the transformer, the contact segments 57, 58 of the commutator 56 are, in a manner shown in the drawings, separated by insulating segments 68, 69 so that the circuit formed by the winding 55 and the relay 63 will be closed only during said commutating intervals.

It is obvious that the current from the winding 55, rectified by the commutator 56, may be directly supplied to the exciting generator 24 or its driving motor, respectively, or to an auxiliary generator which increases or decreases the excitation of said machines. As it is important that the effect is neutralized before it has obtained dangerous values, it may be desirable to arrange for magnifying the correcting direct-current before it is supplied to said exciting winding or windings. It is further possible to arrange the auxiliary transformer 54 in such a manner that either the primary or the secondary side thereof is dominating, for instance by somewhat increasing the number of ampere-turns of said winding, whereby it may be sufficient to provide the relay 63 with only one circuit through the exciting generator 24. Rectifier devices otherwise necessary in the relay and also the auxiliary commutator 56 may thus be omitted.

A modification of the embodiment shown in Fig. 3 is illustrated in Fig. 3a, according to which the auxiliary winding 55 which feeds the relay 63 is provided on the main transformer 19 thereby rendering the auxiliary transformer 54 above described unnecessary. As it is not always suitable for the entire induced flux of the main transformer to pass through the coil 55, said winding may pass through a slit 70 in transformer 4. Due thereto only part of the induced flux of the transformer will pass through the coil 55. In these cases it is necessary that the commutator 56 be so devised, as above described, that it will keep the circuit through the winding 55 open during the working intervals of the transformer. Further modifications of the device shown in Fig. 3 may be undertaken within the scope of the invention.

The plant shown in Figs. 3 and 3a is in other respects in full accordance with the embodiment shown in Fig. 1 and corresponding parts of the plant have in both figures the same references. A minor modification is, however, to be found in Fig. 3 in the connection of the commutating generator 26 to the secondary side by means of a transformer 71 thus rendering the high-voltage insulation of the commutating generator 26 unnecessary. A corresponding arrangement may of course, if desired, be made in the embodiments shown in Figs. 1 and 2, which arrangement is suitable, especially in such cases where the secondary voltage is high.

The stabilization of the ampere-turns of the transformer achieved in the systems above described refers in every case to a certain ratio of the transformer or transformers. If said ratio is to be altered, an adjustment of the stabilizing devices must take place in order to maintain the correct operation thereof. The embodiment of the invention shown in Fig. 4 is especially adapted to be used in such cases where alterations in the ratio are desired or necessary, in order to make possible a variation at will of the ratio without adjustment of the remaining stabilizing parts.

The diagram shown in Fig. 4 is in strict accordance with that of Fig. 1 and all the parts shown in said figure and their connections are to be found in Fig. 4 under the same reference characters as in Fig. 1. In the embodiment shown in Fig. 4 further to the primary side of the transformer 19, which is assumed to have the lower voltage, a regulating transformer 72 of a kind known per se is connected which is provided with primary and secondary windings 73 and 74, respectively. Both ends 75 and 76 of the primary winding 73 are connected to the brushes 11 and 12, respectively, whereas one end 77 of the secondary winding 74 is connected to the one end of the primary winding 2 of the main transformer, the other end of which is connected to the adjustable terminal 78 of the winding 74.

From the figure it will readily be understood that the relation between the direct-current voltage supplied and the direct-current voltage withdrawn may be altered by displacing the adjustable connecting point 78 on the regulating transformer. If the point 78 is displaced in a direction towards the point 77, the alternating current transmitted to the primary winding 2 of the main transformer from the regulating transformer will be decreased so that also the secondary voltage in the winding 3 and hence the direct voltage obtained will decrease, whereas a displacement of the point 78 in the opposite direction will result in an increase of said voltage.

As, however, the ratio or the operating number of ampere turns of auxiliary devices connected to the transformer or transformers, such as commutating generators, exciting generators or the like, always must have a fixed relation to the ratio of the main transformer or in other respects are influenced by the alteration of the regulating transformer 72, each alteration of the ratio of the regulating transformer would necessitate an adjustment of said auxiliary devices. A common adjustment may of course be obtained by making the terminals of the above mentioned windings adjustable and connecting the various adjusting members to each other in a suitable manner, for instance mechanically, but this involves certain complications. This may be avoided by connecting into the primary or secondary circuit of the transformer an adjustable inductive reactance 79 the impedance (apparent resistance) of which is adjusted according to the alteration of the regulating transformer 72. The impedance 79 may, for example, as shown in the figure consist of a self-induction coil 80 connected in series to the winding 73 which coil is in known manner provided with one or more iron cores 81, 82 adjustable with respect to each other or to the coil. The iron cores 80, 82 are in the embodiment shown connected with the adjusting member of the transformer 72 by means of a link system 83. This connection may of course be made in other ways. The arrangement is so devised that the inductive reactance in the circuit of the primary winding 2 remains constant at different alterations of the regulating transformer 72.

By the device shown in Fig. 4 a convenient and not dangerous alteration of the ratio of the transformer within wide limits is made possible. The high-voltage windings of the main transformer and also the low-voltage windings inductively connected thereto may be insulated very effectively and for example, may be placed in closed containers for oil, compressed gas or the like, without necessitating the provision of a great number of junctions leading through insulating brushes in the container wall. Further the low-voltage regulating transformer may be arranged at any desired suitable place where all necessary alterations of the connections may be effected at a safe distance from high-voltage conduits. Certain preferred embodiments of the invention have been disclosed for purposes of illustration only. It is obvious that various changes and substitutions may be made therein as will be apparent to a person skilled in the art. The invention is only to be limited in accordance with the following claims when interpreted in view of the prior art.

Having thus described my invention what I claim is:—

1. In a transformer, primary and secondary windings, a magnetizing winding in induced relationship thereto and means energizing said magnetizing winding, said means being controlled in accordance with the difference between the ampere turns of said primary and secondary windings.

2. In a transformer, primary and secondary windings, means for inducing an alternating exciting flux in said transformer, opposed windings adapted to control said means, said windings having a turn ratio equal to that of said primary and secondary windings and means supplying currents to said opposed windings proportional to the primary and secondary currents respectively of said transformer.

3. In combination, a transformer having primary and secondary windings and an exciting winding in induced relationship thereto, a source of excitation for said exciting winding and control means for said source comprising opposed windings associated with the primary and secondary sides respectively of said transformer and normally neutralizing each other and means operable in response to an unbalance between the effects of said opposed windings to control said source.

4. In combination, a transformer having primary and secondary windings and an exciting winding in induced relationship thereto, an excitation generator associated with said exciting winding and control means for said generator comprising opposed exciting windings connected in the primary and secondary circuits respectively of said transformer and adapted normally to neutralize each other, said exciting windings being operable in response to unbalanced conditions between the primary and secondary circuits to cause said excitation generator to produce an exciting current in said first exciting winding adapted to correct said unbalanced conditions.

5. In combination, a transformer having primary and secondary windings and an exciting winding in induced relationship thereto, an excitation generator associated with said exciting winding and control means for said generator comprising opposed exciting windings, means connecting said exciting windings in the primary and secondary circuits respectively of said transformer, said exciting windings having a turn ratio equal to that of said primary and secondary windings and adapted normally to produce no resultant excitation of said generator and operable in response to a difference in the ampere turns of said primary and secondary windings to cause said generator to produce a current in said first exciting winding adapted to compensate said difference.

6. In combination, a transformer having primary and secondary windings and an exciting winding in induced relationship thereto, an excitation generator associated with said exciting winding and control means for said generator comprising an exciting winding associated therewith, a second transformer having opposed windings associated with said primary and secondary windings and adapted normally to produce no resultant flux, an induced winding associated with said opposed windings and means controlled by the current in said induced winding for controlling the excitation of said generator.

7. In combination, a transformer having primary and secondary windings and an exciting winding in induced relationship thereto, an excitation generator associated with said exciting winding and control means for said generator comprising an exciting winding associated therewith, a second transformer having opposed windings associated with said primary and secondary windings and adapted normally to produce no resultant flux, an induced winding associated with said opposed windings, a relay controlled by the current in said induced winding, a source of excitation for said excitation generator and means controlled by said relay to control the polarity and value of excitation supplied from said source to said generator.

8. A direct current transformer system comprising a transformer having primary and secondary windings, means for periodically reversing a direct current and supplying said current so reversed to said primary winding, an exciting winding associated with said transformer, a source of exciting current for said winding, means controlled in accordance with the difference between the ampere turns of said primary and secondary windings for controlling said source and causing said source to produce an excitation in said exciting winding adapted to compensate said difference and means rendering said control means operative only during reversal of said primary current.

9. A transformer having primary and secondary windings, a core of magnetic material in induced relationship to said windings, an exciting winding in induced relationship with said core and an impulse winding associated with said core and in induced relationship with respect to a portion only of the flux passing through said core.

10. In combination, a transformer having a core, primary, secondary, and excitation winding circuits in induced relationship therewith, an excitation machine adapted to energize said excitation winding circuit to establish the necessary alternating flux in the core, a commutator associated with said primary winding circuit, and means responsive to the occurrence of excitation current components in said primary winding circuit to cause said excitation machine to neutralize said excitation components.

11. In combination, a plurality of transformers having cores, primary and secondary winding circuits and an excitation winding circuit in induced relationship with each of said cores, an excitation machine adapted to energize said excitation winding circuits to establish the necessary alternating flux in each core, commutators associated with the respective primary winding circuits, and means responsive to the occurrence of excitation current components in said primary winding circuits to cause said excitation machine to neutralize said excitation components.

12. In combination, a transformer having a core, primary, secondary and excitation winding circuits in induced relationship therewith, an excitation machine adapted to energize said excitation winding circuit to establish the necessary alternating flux in the core, a commutator associated with each of the primary and secondary winding circuits, and means responsive to the occurrence of reactive current components in one of said primary and secondary circuits to cause said excitation machine to neutralize said reactive components.

13. In combination, a plurality of transformers having cores, primary and secondary winding circuits and an excitation winding circuit in induced relationship with each of said cores, an excitaton machine adapted to energize said excitation winding circuits to establish the necessary alternating flux in each core, commutators associated respectively with said primary and secondary circuits, and means responsive to the occurrence of reactive current components in one of said primary and secondary circuits of each core adapted to cause said excitation machine to neutralize said reactive components.

BALTZAR CARL von PLATEN.